(12) United States Patent
Kusakawa et al.

(10) Patent No.: US 10,148,213 B2
(45) Date of Patent: Dec. 4, 2018

(54) ELECTRONIC POWER EQUIPMENT (71) Applicant: MAKITA CORPORATION, Anjo-shi, Aichi-ken (JP)

(72) Inventors: Takuya Kusakawa, Anjo (JP); Katsuna Hayashi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 145 days.

(21) Appl. No.: 15/223,893

(22) Filed: Jul. 29, 2016

(65) Prior Publication Data
US 2017/0040919 A1 Feb. 9, 2017

(30) Foreign Application Priority Data

Aug. 6, 2015 (JP) .................. 2015-156057

(51) Int. Cl.
| | |
|---|---|
| *H02P 25/14* | (2006.01) |
| *H02K 11/33* | (2016.01) |
| *A47L 5/12* | (2006.01) |
| *H02P 4/00* | (2006.01) |
| *A47L 9/28* | (2006.01) |

(52) U.S. Cl.
CPC ............ *H02P 25/14* (2013.01); *A47L 5/12* (2013.01); *A47L 9/2878* (2013.01); *H02K 11/33* (2016.01); *H02P 4/00* (2013.01)

(58) Field of Classification Search
CPC .... H02P 25/14; H02P 1/16; H02P 3/06; H02P 1/00; H02P 6/00; H02P 7/00; H02P 8/00; H02P 1/40; H02P 3/18; H02P 3/20; H02P 25/28; H02P 1/42; H02P 1/44; H02K 11/33

USPC .......... 318/107, 124, 245, 246, 255, 400.01, 318/400.14, 700, 701, 727, 432, 722, 800, 318/801, 746, 747, 774, 778, 790, 803, 318/440, 554, 555; 76/31, 37; 15/246.2, 15/319, 345, 412

See application file for complete search history.

(56) References Cited

U.S. PATENT DOCUMENTS

| | | | |
|---|---|---|---|
| 6,448,732 B1 * | 9/2002 | Block | A47L 9/2842 15/339 |
| 8,732,896 B2 * | 5/2014 | Lucas | A01D 34/78 15/319 |
| 2004/0088817 A1 | 5/2004 | Cochran et al. | |
| 2008/0284363 A1 * | 11/2008 | Lucas | A01D 34/78 318/441 |

FOREIGN PATENT DOCUMENTS

JP 2004-160235 A 6/2004

\* cited by examiner

*Primary Examiner* — Antony Paul
(74) *Attorney, Agent, or Firm* — Oliff PLC (57) ABSTRACT

An electronic power equipment, which is configured to be connected to both an AC power source and a DC power source, has a motor 14 configured to be driven by both AC power and DC power, an AC circuit 30 for supplying AC electric power to the motor 14, a DC circuit 40 for supplying DC electric power to the motor 14, switching parts RL1-RL12 for switching between the AC circuit 30 and the DC circuit 40 wherein the AC and DC circuits are insulated relative to each other, and a controller A1 configured to control the switching parts RL1-RL12, the AC circuit 30, and the DC circuit 40.

13 Claims, 10 Drawing Sheets

ELECTRONIC POWER EQUIPMENT

CROSS-REFERENCE

This application claims priority to Japanese patent application serial number 2015-156057, filed on Aug. 6, 2015, the contents of which are incorporated herein by reference in its entirety.

TECHNICAL FIELD

The present invention generally relates to electronic power equipment capable of connecting to both an AC power source and a DC power source.

BACKGROUND ART

Japanese Laid-Open Patent Publication No. 2004-160235 discloses a related electronic power equipment, comprising an AC/DC vacuum cleaner having a DC motor as a power source. The disclosed electronic power equipment is configured such that an AC voltage supplied from a wall outlet is first converted to a DC voltage by use of an AC/DC converter before the DC voltage is supplied to a DC motor. Furthermore, the disclosed electronic power equipment is configured such that a DC voltage supplied from a battery is also supplied to the DC motor via a DC/DC converter.

The AC/DC vacuum cleaner described above includes an AC/DC converter that can convert an AC voltage to a DC voltage to supply the voltage to a motor. Generally, such an AC/DC converter includes an isolation transformer, and accordingly a vacuum cleaner having such an AC/DC converter may increase in size.

In view of the above, there is a need in the art to manufacture electronic power equipment that can be driven by both AC power and DC power and is compact in structure.

SUMMARY

In a first aspect of the present teachings, an electronic power equipment configured to be connected to both an AC power source and a DC power source is disclosed, wherein the electronic power equipment may have a motor configured to be driven by both AC power and DC power, an AC circuit for supplying AC power to drive the motor, a DC circuit for supplying DC power to drive the motor, a switching mechanism for switching between the AC circuit and the DC circuit where the respective circuits are insulated from each other, and a controller configured to control the AC circuit, the DC circuit, and the switching part.

According to the first aspect, an AC/DC converter for converting AC power to DC power in supplying the power to a DC motor, as present in the background art, may not be needed, allowing the electronic power equipment to be made in a more compact manner.

In another aspect of the present teachings, the switching mechanism may switch between the AC circuit and the DC circuit using a plurality of relay switches, each having a mechanical contact. This mode of switch and circuit construction enables, the AC circuit and the DC circuit can to be easily switched from one to the other, where both circuits are insulated from each other, in a simple structure.

Figure 6:
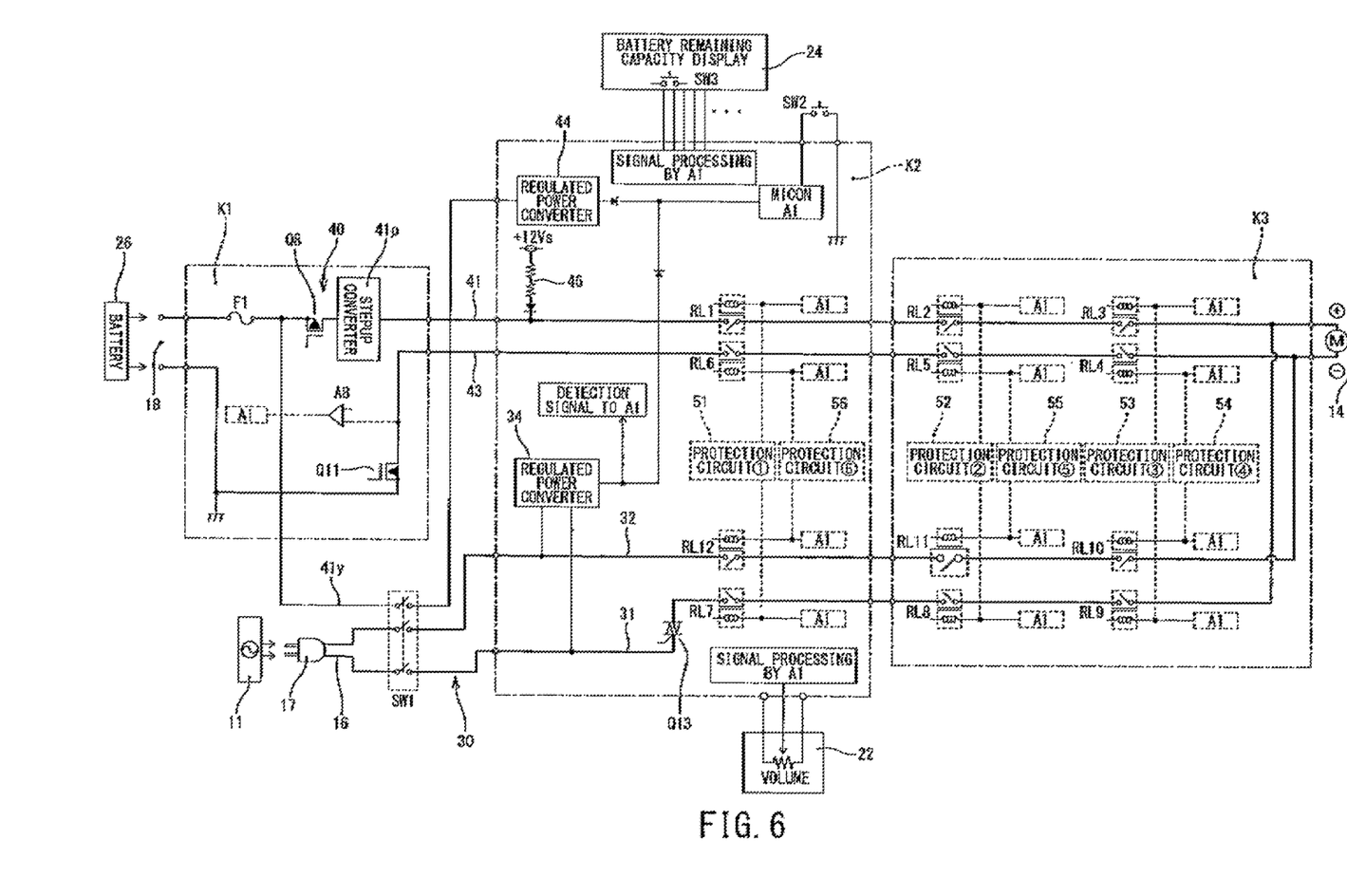
FIG. 6 is an electric circuit diagram of the dust collector.

In another aspect of the present teachings, the switches may be arranged in both a positive line and a negative line in the AC circuit and both a positive line and a negative line in the DC circuit. Applicant defines positive line and negative line of an AC circuit in this application to be the lines of the AC circuit connecting to the positive or negative terminals of a motor, respectively, where the motor terminals correspond to the positive and negative lines of a DC circuit to which the motor is also connected (e.g. in FIG. 6, 31 is the positive line of the AC circuit, connected to the positive terminal of the motor, while 32 is the negative line of the AC circuit, connected to the negative terminal of the motor, where the terminals of the motor correspond to the DC circuit 40 to which it is also connected). In the present teachings, in accordance with the definition, the positive line and the negative line in the AC circuit, as well as the positive line and the negative line in the DC circuit may be connected to the motor. Because of the presence of switches along the circuits, insulation properties between the AC circuit and the DC circuit can be easily and reliably obtained.

In another aspect of the present teachings, a plurality of switches may be arranged in series in both the positive line and the negative line in the AC circuit, and also a plurality of switches may be arranged in series in both the positive line and the negative line in the DC circuit. Because of this series arrangement of switches, a predetermined insulation distance between the AC circuit and the DC circuit can be easily and reliably obtained.

In another aspect of the present teachings, the controller may be configured to perform a running test of the switches in the positive line and the negative line in the DC circuit before driving the motor for the first time after the electronic power equipment is powered on. Because of this controller configuration, reliability of the switching mechanism can be improved.

In another aspect of the present teachings, the controller may be configured to perform a running test of the switches in the positive line and the negative line in the DC circuit when the switching mechanism switches between the AC circuit and the DC circuit. Because of this controller configuration, reliability of the switching mechanism can be improved.

In another aspect of the present teachings, the controller may be configured to supply power to the motor from the AC power source when the electronic power equipment is connected to both the AC power source and the DC power source. Because of this controller configuration, consumption of the DC power source, e.g. batteries, can be suppressed.

In another aspect of the present teachings, the controller may be configured to stop driving of the motor when the AC power source is disconnected from the electronic power equipment. Because of this controller configuration, the motor is prevented from being driven by the DC power source, e.g. batteries, when the AC power source is disconnected (e.g. a plug supplying AC power is pulled out of a wall outlet). Thus, inadvertent decrease of battery life is prevented.

In another aspect of the present teachings, both the AC circuit and the DC circuit may each include at least one adjusting element for adjusting electric power supplied to the motor. Furthermore, the controller may switch the mechanical contacts of the relay switches from their pre-existing state to the opposite state (e.g. from closed to open or vice versa) while switching off the adjusting element. Because of this mode of switching off the adjusting element, current will not flow regardless of whether the contacts of the switches are opened and/or closed, and thus the contacts of the switches can be reliably protected.

In another aspect of the present teachings, the electronic power equipment may further include interlock circuits that prevent the mechanical contacts of the relay switches in the DC circuit from closing when the mechanical contact of the relay switches in the AC circuit are closed. Because of this construction, even if the controller malfunctions, a failure such that current flows simultaneously both in the AC circuit and the DC circuit may not occur.

In another aspect of the present teachings, there is i) at least one relay switch in the positive and negative line, respectively, in the AC circuit, and ii) at least one relay switch in the positive and negative line, respectively, in the DC circuit, wherein iii) interlock circuits (each interlock circuit corresponds to an AC switch and a DC switch pairing, where the AC and DC switches are located on the same type of line (positive or negative) in the AC and DC circuit, respectively) and corresponding switches of the positive and negative lines of the AC and DC circuits may be located on the same electronic circuit board. Because of this construction, wirings of the interlock circuit may not be crossed between electrical circuit boards, and accordingly, disconnection of the wirings of the interlock circuit can be prevented. Thus, reliability of the interlock circuit can be maintained.

In another aspect of the present teachings, the electronic power equipment may further include a main switch configured to switch on and off, collectively, the positive and negative lines in the AC circuit and a DC line connected to the DC power source.

According to the present teachings, an electronic power equipment that can be driven by both AC power and DC power can be manufactured in a compact structure.

DETAILED DESCRIPTION OF EMBODIMENTS

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring significant aspects of the exemplary embodiments presented herein.

Hereinafter, an electronic power equipment according to one exemplary embodiment of the present teachings will be described with reference to FIGS. 1 to 10. The electronic power equipment according to the embodiment may be a dust collector 10 that can suck (collect) dusts and/or debris generated when a material to be cut is processed using a tool. The front, rear, left, right, upper, and lower sides of the drawings correspond to the front, rear, left, right, upper, and lower sides of the dust collector 10.

Figure 1:
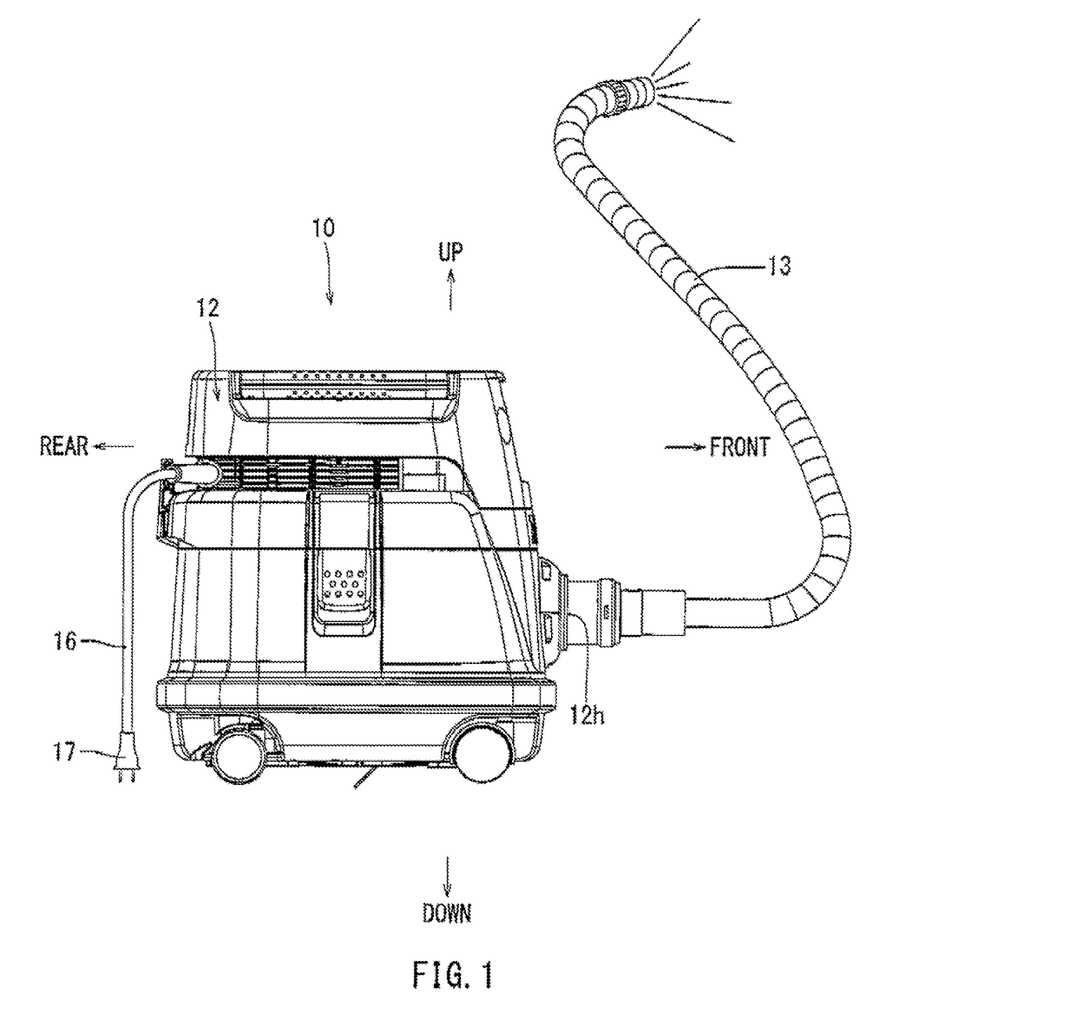
FIG. 1 is a side view of a dust collector according to one exemplary embodiment of the present disclosure.

As shown in FIG. 1, the dust collector 10 may generally include a dust collector main body 12 and a suction hose 13 that is connected to a dust collection port 12h of the dust collector main body 12. The dust collector main body 12 may be configured such that airflow is generated by a fan (not shown) that is rotated by an electric motor 14 (refer to an electric circuit diagram of FIG. 6) and outside air including dust and/or debris can be sucked from the dust collection port 12h via the suction hose 13 due to the airflow. Furthermore, the outside air including the dust and/or debris may be passed through a filter (not shown) provided in the dust collector main body 12 to separate the dust and/or debris from the air, which may be discharged from an exhaust port (not shown). Because of this configuration, dust and/or debris sucked from the dust collection port 12h may be collected inside the dust collector main body 12. As shown in the electric circuit diagram of FIG. 6, the dust collector main body 12 may be configured such that the motor 14 is driven by an AC power source from a wall outlet 11 or a DC power source from batteries 26. The motor 14 may be a universal motor that can be driven by both an AC power source and a DC power source.

Figure 2:
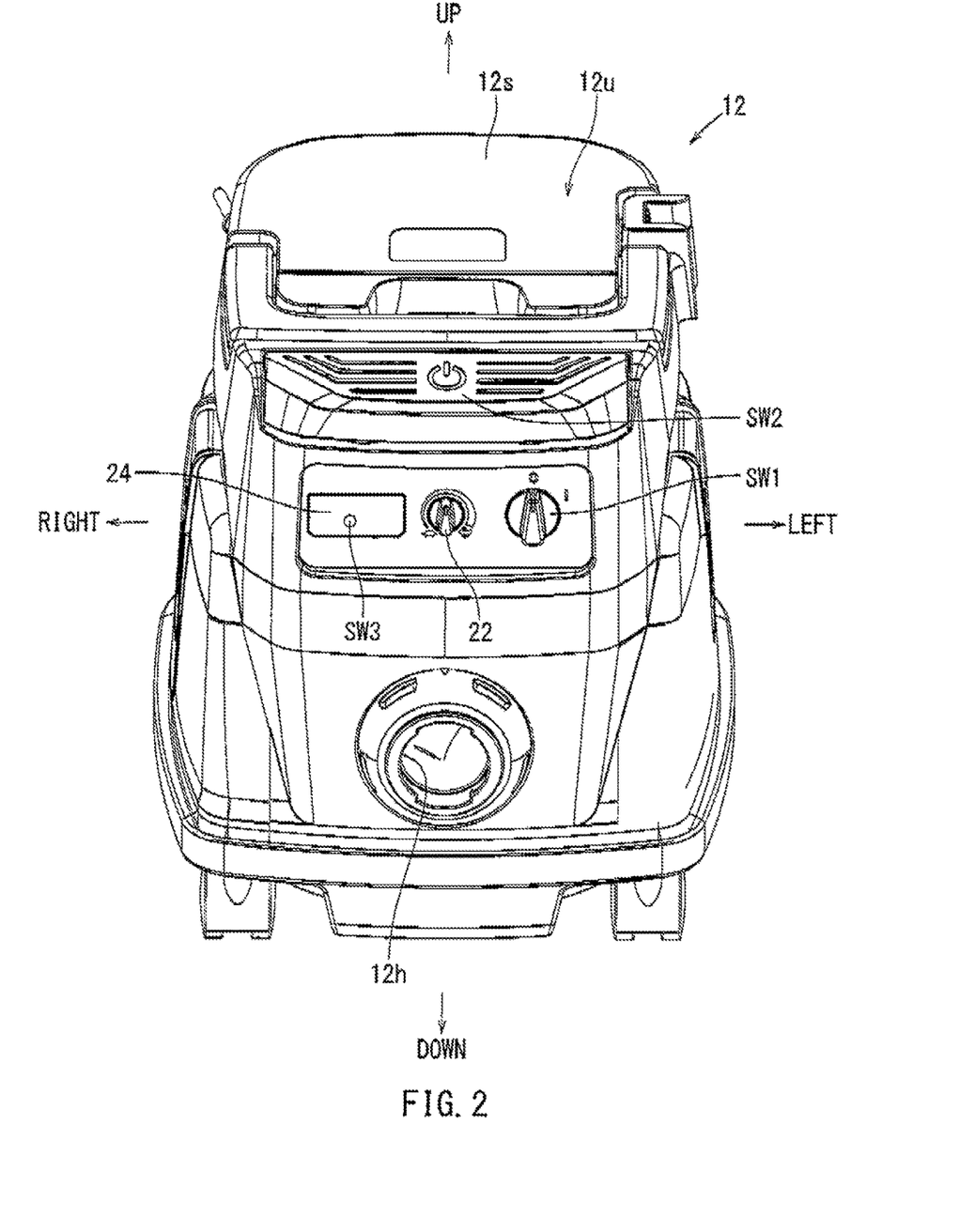
FIG. 2 is a front view of the dust collector.
Figure 3:
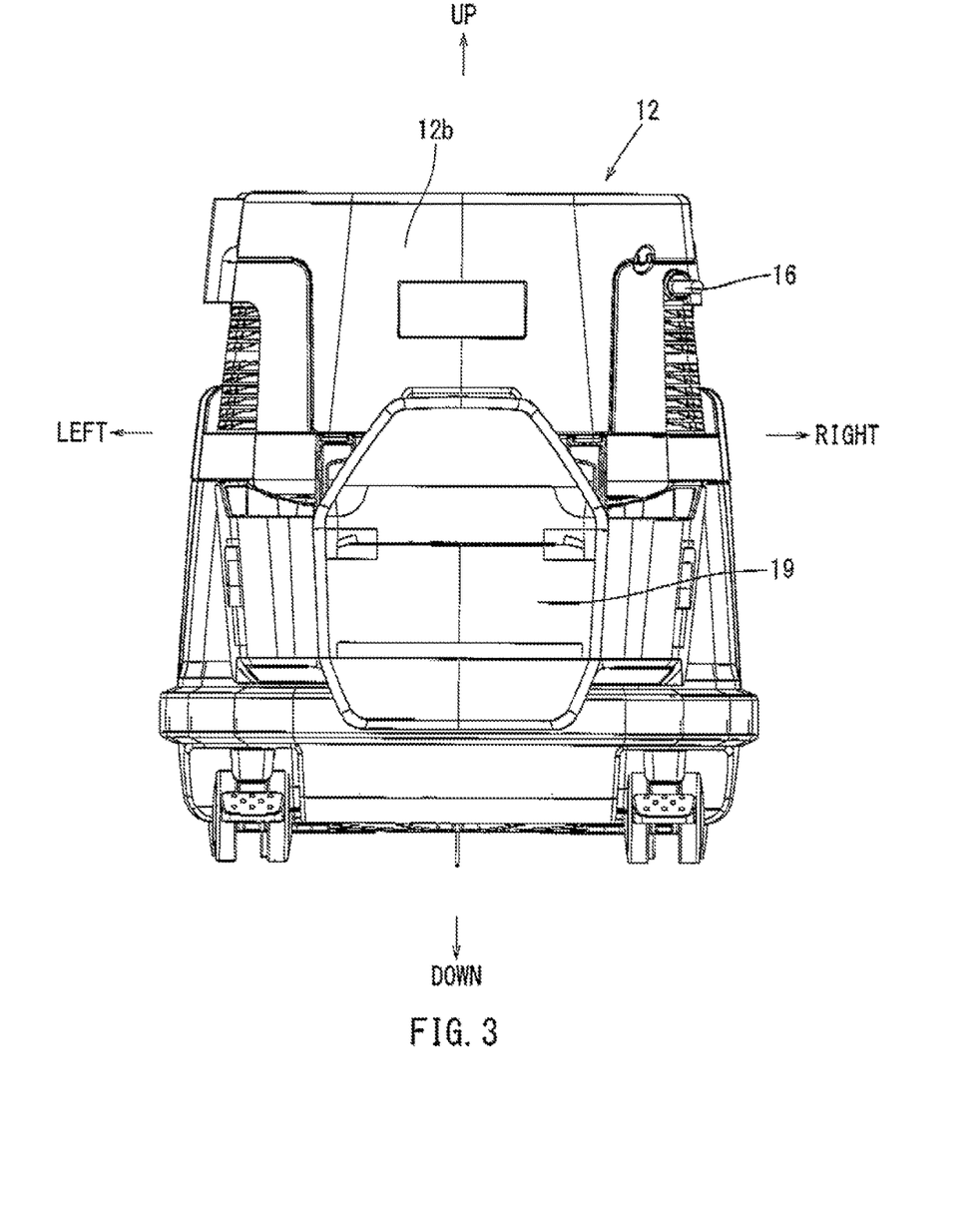
FIG. 3 is a back view of the dust collector.
Figure 4:
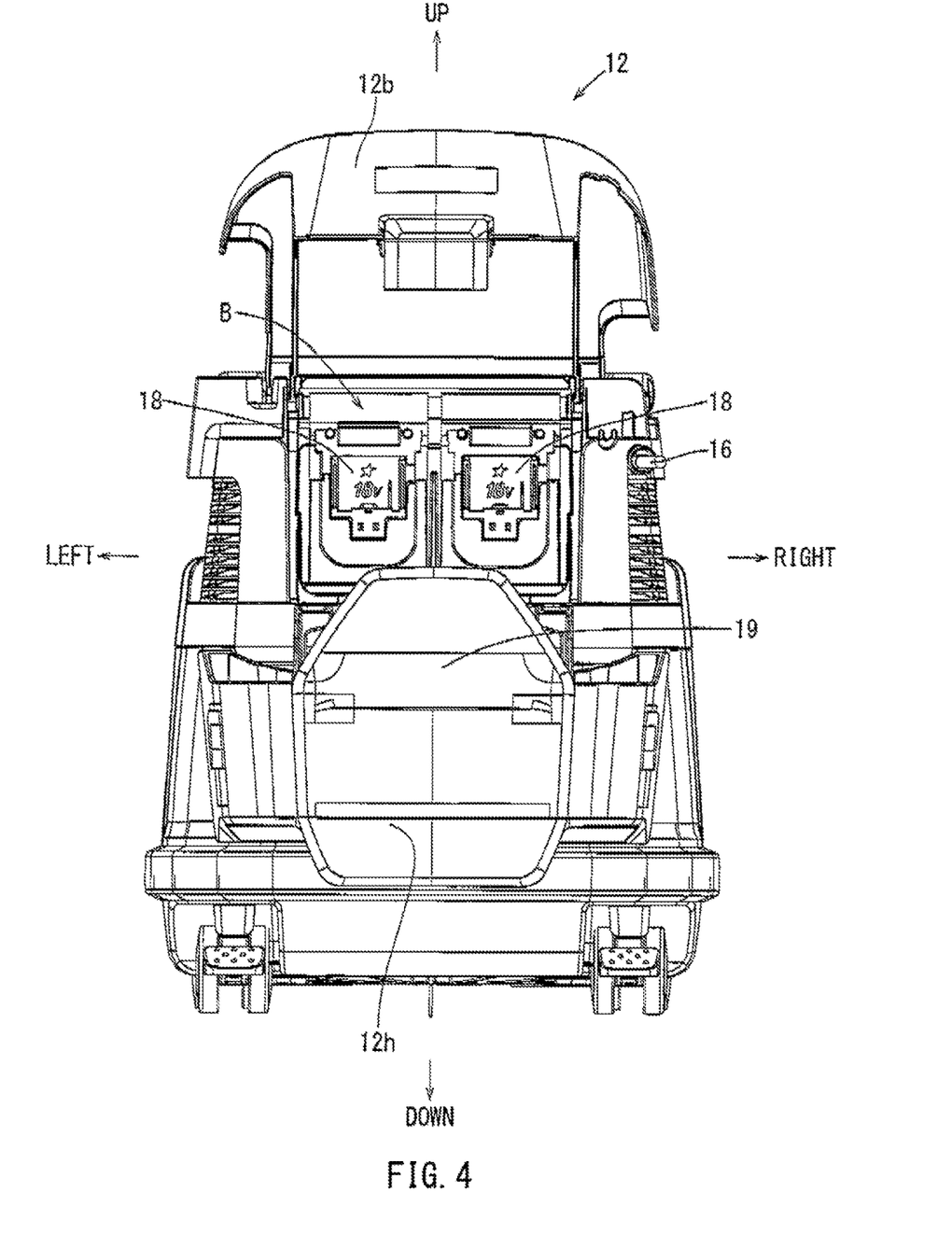
FIG. 4 is another back view of the dust collector.
Figure 5:
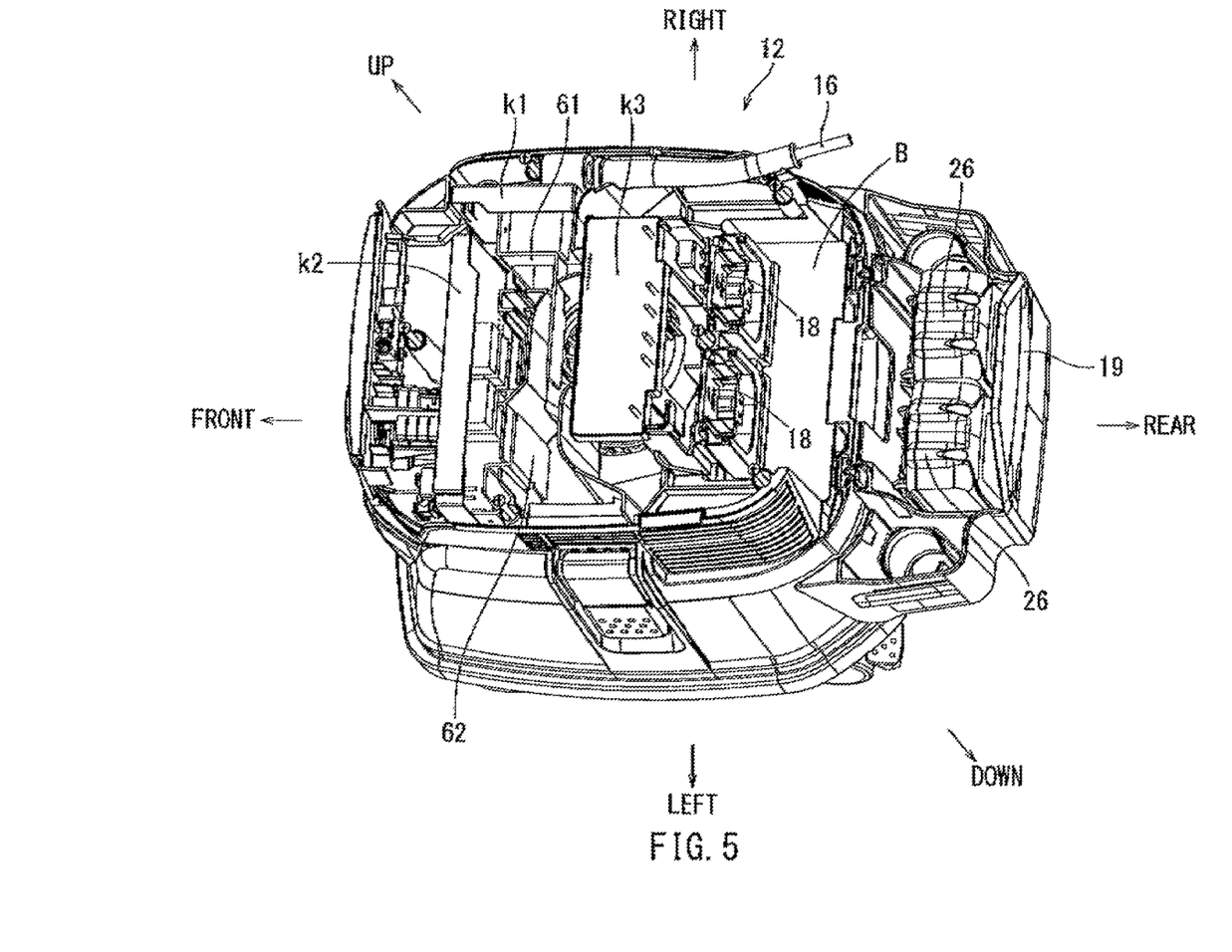
FIG. 5 is a perspective view of the dust collector showing a top face cover is removed from thereof.

As shown in FIG. 2, the dust collection port 12h may be located at a center lower part of the front face of the dust collector main body 12. Furthermore, a main power switch SW1, a speed adjustment volume 22, and a battery remaining display 24 may be provided above the dust collection port 12h. Furthermore, a drive switch SW2 for driving and stopping the motor 14 may be provided at an upper part of the front face of the dust collector main body 12. As shown in FIGS. 2 to 4, a top plate 12u of the dust collector main body 12 may include a top plate fixing part 12s located on a front side thereof (refer to FIG. 2), and a rotary lid part 12b located on a rear side thereof and configured to be rotated upward with respect to the top plate fixing part 12s (refer to FIGS. 3 and 4). Furthermore, as shown in FIGS. 4 and 5, the rotary lid part 12b of the top plate 12u may be configured to open and close a battery compartment B that is formed in an upper part of the back of the dust collector main body 12. FIG. 5 shows the dust collector main body 12 in a state where the top plate 12u etc. is removed therefrom.

As shown in FIGS. 4 and 5, a pair of battery connection receptacles 18 may be provided on a front side vertical wall of the battery compartment B of the dust collector main body 12. The battery compartment B may be configured such that batteries 26 can be connected by sliding the batteries 26 in a downward direction, into the receptacles. DC power may be supplied to the dust collector main body 12 in a state where batteries 26 are connected to the pair of the battery connection receptacles 18. Furthermore, when the batteries 26 are connected to the battery connection receptacles 18, waterproofing of the batteries 26 may be achieved by closing the rotary lid part 12b of the top plate 12u.

As shown in FIG. 5, an upper-open-type battery holding case 19 that can hold two auxiliary batteries 26 may be provided below the battery compartment B of the dust collector main body 12. Furthermore, a power cord 16 with a plug may be provided on a right surface of the rear part of the dust collector main body 12. When the plug 17 of the power cord 16 is connected to a wall outlet 11 (refer to FIG. 6), AC power may be supplied to the dust collector main body 12.

As shown in FIG. 6, an electrical circuit of the dust collection main body 12 may include an AC circuit 30 for driving the motor 14, a DC circuit 40 for driving the motor 14, a plurality of relay switches RL 1 to 12 used for switching between the AC circuit 30 and the DC circuit 40, protection circuits 51 to 56, and a microcomputer controller A1, etc. Furthermore, the AC circuit 30, the DC circuit 40, the plurality of relay switches RL 1 to 12, the protection circuits 51 to 56, and the microcomputer controller A1, etc. may be mounted on an electrical circuit divided into three boards, i.e., a first electrical circuit board K1, a second electrical circuit board K2, and a third electrical circuit board K3.

As shown in FIG. 6, the AC circuit 30 for driving the motor 14 may supply AC power, which is supplied to the dust collector main body 12 via the plug 17 of the power cord 16 from the wall outlet 11, to the motor 14. The AC circuit 30 may include a positive line 31 connected to a positive terminal of the motor 14 and a negative line 32 connected to a negative terminal of the motor 14 (where positive and negative line in the context of the AC circuit is defined above). Furthermore, both the positive line 31 and the negative line 32 may each be connected to the plug 17 of the power cord 16 via the main power switch SW1 provided on a front surface of the dust collector main body 12. A bidirectional thyristor Q13 capable of adjusting electric power supplied to the motor 14 may be provided at a secondary side of the main power switch SW1 in the positive line 31 of the AC circuit 30.

As shown in FIG. 6, in the positive line 31 of the AC circuit 30, a first relay switch RL7, a second relay switch RL8, and a third relay switch RL9 may be located in series between the bidirectional thyristor Q13 and the positive terminal of the motor 14. Furthermore, in the negative line 32 of the AC circuit 30, a fourth relay switch RL 10, a fifth relay switch RL 11, and a sixth relay switch RL 12 may be located in series between the secondary side of the main power switch SW1 and the negative terminal of the motor 14. The first relay switch RL 7 to the sixth relay switch RL 12 may be structurally configured such that each mechanical contact of the relays RL 7 to RL 12 can be opened and closed by an electromagnetic force generated by a coil mounted on each relay. A regulated power converter 34 that may convert an AC voltage to a DC voltage may be provided in the AC circuit 30 in order to obtain a constant voltage power source from the AC circuit. The DC voltage produced by the regulated power converter 34 may be supplied to power a microcomputer controller A1. Furthermore, a voltage signal (detection signal) of the regulated power converter 34, reflecting the converted AC voltage, may be input to the microcomputer controller A1. Because of this signal, the microcomputer controller A1 is able to detect that AC power has been supplied to the dust collector main body 12.

As shown in FIG. 6, the DC circuit 40 for driving the motor 14 may supply DC power from the batteries 26, which are supplied to the dust collector main body 12 via the battery connection receptacles 18, to the motor 14. The DC circuit 40 may include a positive line 41 connected to the positive terminal of the motor 14 and a negative line 43 connected to the negative terminal of the motor 14. In the positive line 41, a fuse F1 may be located near the battery connection parts 18, and a control line 41y may branch from the positive line 41 at a secondary side of the fuse F1. The control line 41y may be connected to a regulated power converter 44 via the main power switch SW1, and a DC voltage produced by the regulated power converter 44 may be supplied to the microcomputer controller A1 etc. The regulated power converter 34 in the AC circuit 30 may be connected to an anode of a first diode, and the regulated power converter 44 in the DC circuit 40 may be connected to an anode of a second diode. A cathode of the first diode and a cathode of the second diode may then be connected to each other to supply to the microcomputer controller A1. Because of this construction, the microcomputer controller A1 can operate by either AC power or DC power being supplied. The control line 41y may correspond to a power supply line of the present disclosure.

As shown in FIG. 6, in the positive line 41 of the DC circuit 40, a first FET (field effect transistor) Q8, which is a switching element, may be located downstream of the branch point between the control line 41y and the positive line 41, and a stepup converter 41p may be located downstream of the first FET Q8. The stepup converter 41p may boost a voltage of the battery 26 to a suitable voltage for driving the motor 14. An output voltage of the stepup converter 41p may be set lower than an effective value of the AC voltage. Furthermore, in the positive line 41, a first relay switch RL1, a second relay switch RL2, and a third relay switch RL3 may be located in series between the stepup converter 41p and the positive terminal of the motor 14. In the negative line 43 of the DC circuit 40, a second FET Q11, which is an adjusting clement for adjusting electric power that is supplied to the motor 14, may be located on a side of the battery connection receptacles 18. Furthermore, a fourth relay switch RL 4, a fifth relay switch RL 5, and a sixth relay switch RL6 may be located in series between the second FET Q11 and the negative terminal of the motor 14. The first relay switch RL 1 to the sixth relay switch RL 6 may have the same structure as RL 7 to RL 12 of the AC circuit, and may also be structurally configured such that each mechanical contact of each relay switch can be opened and closed by an electromagnetic force generated by a coil mounted on each relay switch.

In the DC circuit 40, a voltage application part 46 that can apply a voltage (+12V) for performing a relay running test may be located between the stepup converter 41p and the first relay switch RL1 in the positive line 41. Furthermore, a comparator A8, which compares a voltage of the negative line 43 (a voltage for checking a relay operation) with a reference voltage (Vs), may be located between the sixth relay RL 6 and the second FET Q11 in the negative line 43. An output signal of the comparator A8 may be input to the microcomputer controller A1. The reference voltage (Vs) may be between 0V to 12 V, (e.g. 3V).

The microcomputer controller A1 can switch between the DC circuit 40 and the AC circuit 30 by operating the relay switches RL 1 to RL 12, and also control driving of the motor 14 by operating the bidirectional thyristor Q13, the first FET Q8, and the second FET Q11, etc. Specific output terminals of the microcomputer controller A1 may be electrically connected to the coils of the relay switches RL 1 to RL 12. Furthermore, a signal of the drive switch SW2 for driving and stopping the motor 14 and a signal of the speed adjustment volume 22 may be input to the microcomputer A1. Furthermore, the microcomputer controller A1 may be configured to perform a running test of relay switches RL 1 to RL 6 by utilizing the voltage application part 46 and the comparator A8 in the DC circuit 40. Furthermore, the microcomputer controller A1 may be configured to monitor the voltage of the batteries 26 and display a resulting battery remaining capacity on a battery remaining capacity display 24. The battery remaining capacity display 24 may be configured such that the battery remaining capacity can be shown for a predetermined period of time when a confirmation switch SW3 is pressed while the battery 26 is connected. Even when the motor 14 is driven by the AC power source, a remaining capacity of the batteries 26 can be displayed for a predetermined period of time if the confirmation switch SW3 is pressed and the batteries 26 are connected through the battery connection receptacles 18. In this way, the microcomputer controller A1 may correspond to a control section of the present teachings, and the relay switches RL 1 to RL 12 may correspond to a switching mechanism, as described above.

Protection circuits 51 to 56 may be interlock circuits that are configured such that even if the microcomputer controller A1 malfunctions, the contacts of the first relay switch RL 1 to the sixth relay switch RL 6 in the DC circuit 40 may not be closed (where being closed would allow current to flow) when the first relay switch RL 7 to the sixth relay switch RL 12 in the AC circuit 30 are closed. The protection circuits 51 to 56, acting as interlock circuits, may be configured not to close the contacts of the relay switches RL 1 to RL 12 by preventing a current from flowing through the coils of the relays RL 1 to RL 12. The protection circuits 51 to 56 may comprise a first protection circuit 51, a second protection circuit 52, a third protection circuit 53, a fourth protection circuit 54, a fifth protection circuit 55, and a sixth protection circuit 56. As shown in FIG. 6, the first protection circuit 51 may serve as an interlock circuit between the first relay switch RL7 in the AC circuit 30 and the first relay switch RL1 in the DC circuit 40. Similarly, the second protection circuit 52 may serve as an interlock circuit between the second relay switch RL8 in the AC circuit 30 and the second relay switch RL2 in the DC circuit 40, . . . , and the sixth protection circuit 56 may serve as an interlock circuit between the sixth relay switch RL12 in the AC circuit 30 and the sixth relay switch RL6 in the DC circuit 40.

The first electrical circuit board K1, the second electrical circuit board K2, and the third electrical circuit board K3 may comprise electrical circuit boards on which the electrical components of the dust collector main body 12 are mounted. Considering an installation space, the circuit may be divided into three boards. As shown in FIG. 6, the first FET Q8, the second FET Q11, the stepup converter 41p, and the comparator A8, etc. may be mounted on the first electrical circuit board K1. As shown in FIG. 5, the first electrical circuit board K1 may be attached and/or erected along a right side wall in the housing of the dust collector main body 12. Furthermore, a heat sink 61 of the first FET Q8, and the second FET Q11 may protrude to a central area of the housing.

Furthermore, as shown in FIG. 6, i) the microcomputer controller A1, ii) the regulated power converter 44, the voltage application part 46, the first relay switch RL 1 in the DC circuit, the sixth relay switch RL6 in the DC circuit 40, and iii) the regulated power converter 34, the bidirectional thyristor Q13, the first relay switch RL7 in the AC circuit, and the sixth relay switch RL 12 in the AC circuit, etc. may be mounted on the second electrical circuit board K2. Furthermore, the first protection circuit 51 and the sixth protection circuit 56 may be mounted on the second electrical circuit board K2. As shown in FIG. 5, the second electrical circuit board K2 may be installed in the right and left direction on a front side of the housing of the dust collector main body 12. Furthermore, a heat sink 62 of the bidirectional thyristor Q13 may be installed on the rear left side of the second electrical circuit board K2.

Furthermore, as shown in FIG. 6, i) the second relay switch RL2, the third relay switch RL3, the fourth relay switch RL4, and the fifth relay switch RL5, wherein these switches are in the DC circuit 40, and ii) the second relay switch RL8, the third relay switch RL9, the fourth relay switch RL10, and the fifth relay switch RL11, wherein these switches are in the AC circuit 30, may all be mounted on the third electrical circuit board K3. Furthermore, the second protection circuit 52, the third protection circuit 53, the fourth protection circuit 54, and the fifth protection circuit 55 may be also mounted on the third electrical circuit board K3. As shown in FIG. 5, the third electrical circuit board K3 may be installed in the rear part of the housing of the dust collector main body 12, in more detail, on an upper front side of the pair of the battery connection receptacles 18, in its horizontal state. As described above, the relay switches RL 2 to RL 5 in the DC circuit 40, the relay switches RL 8 to RL 11 in the AC circuit 30, and the second protection circuit 52 to the fifth protection circuit 55 may be installed on the same electrical circuit board, and accordingly wirings of the protection circuits 52 to 55 (interlock circuits) may not be crossed between the electrical boards, which can prevent disconnection of the wirings.

Next, how to operate the dust collector 10 will be explained below according to flowcharts shown in FIGS. 7 to 10. Processes according to the flowcharts shown in FIGS. 7 to 10 may be executed at predetermined times according to a program stored in the memory of the microcomputer controller A1, which may be a non-transient form of memory such as a ROM, a PROM, an EPROM, an EEPROM, etc. At first, a case will be explained below where not only the batteries 26 are connected to the pair of the battery connection receptacles 18 of the dust collector main body 12 but also the plug 17 of the power cord 16 is connected to the wall outlet 11. When the main power switch SW1 is switched on in this state, electric power from the regulated power converter 34 in the AC circuit 30 and also electric power from the regulated power converter 44 in the DC circuit 40 may be supplied to power the microcomputer controller A1. At this time, a detection signal, reflecting the converted AC voltage, from the regulated power converter 34 in the AC circuit 30 may be input to the microcomputer controller A1, and accordingly the microcomputer controller A1 may detect that AC power is supplied to the dust collector main body 12. In the program in the memory of microcomputer controller A1, processes may be performed such that AC power is prioritized.

When the microcomputer A1 is run, a procedure below may be performed at intervals of predetermined time as shown in S101 of FIG. 7. In S102 a watch dog timer may be cleared. The watch dog timer may be configured such that the microcomputer controller A1 may be reset unless the timer is cleared within a predetermined time. Next, in S103, an ON/OFF operation of the drive switch SW2 for driving and stopping the motor 14 and an ON/OFF operation of the confirmation switch SW3 of the battery remaining capacity display 24 may be checked. Then, in S104, a processing to convert an analog signal, such as a voltage signal of the batteries 26 and a signal from the speed adjustment volume 22, to a digital signal, may be performed. In S105, an abnormal voltage and/or current of the battery 26 may be confirmed. Next, in S106, a judgment of the power source, i.e., which of the DC or AC power source is being used, may be performed. Then, in S107, a relay control processing may be performed.

Figure 8:
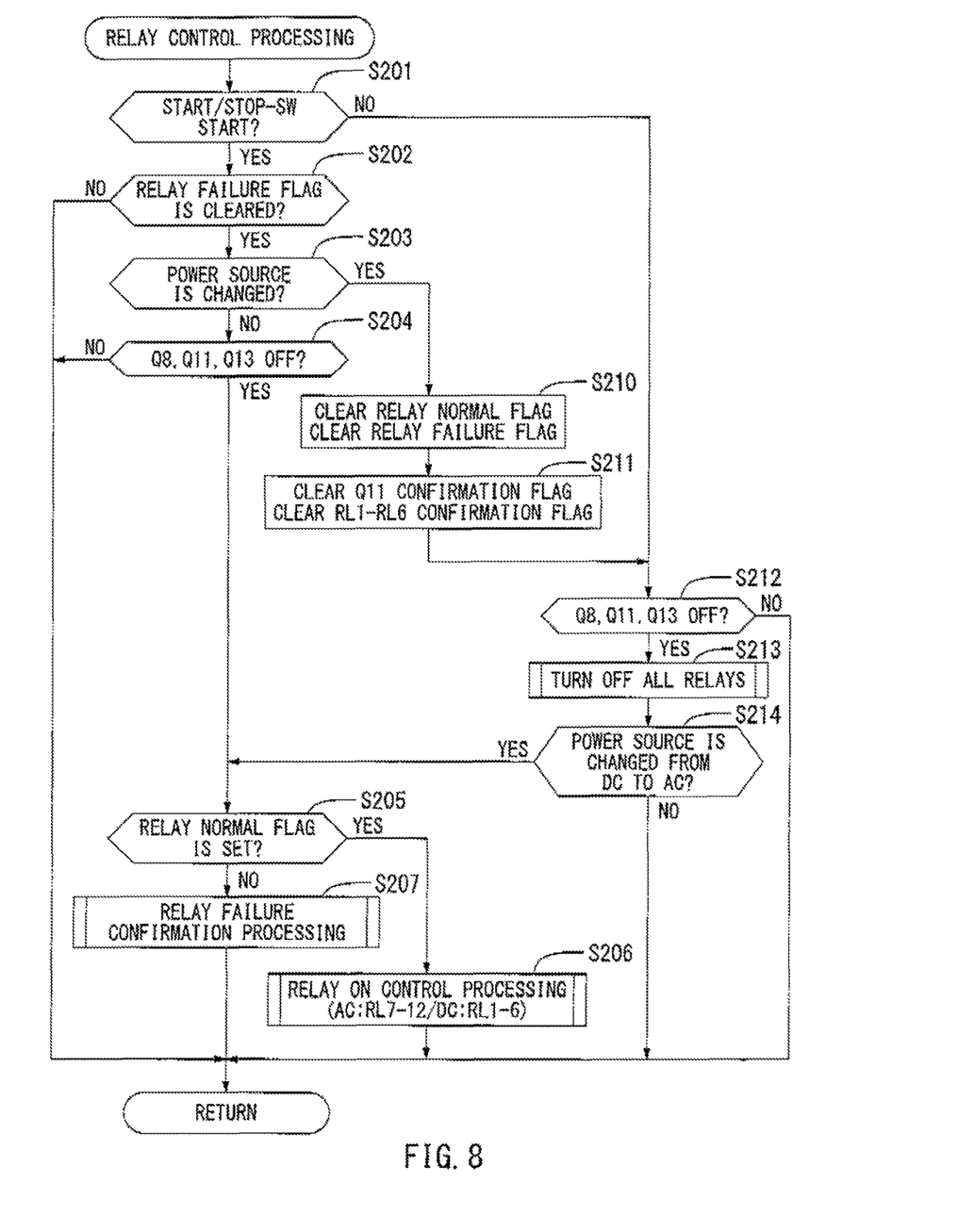
FIG. 8 is another control flowchart of the dust collector.
Figure 9:
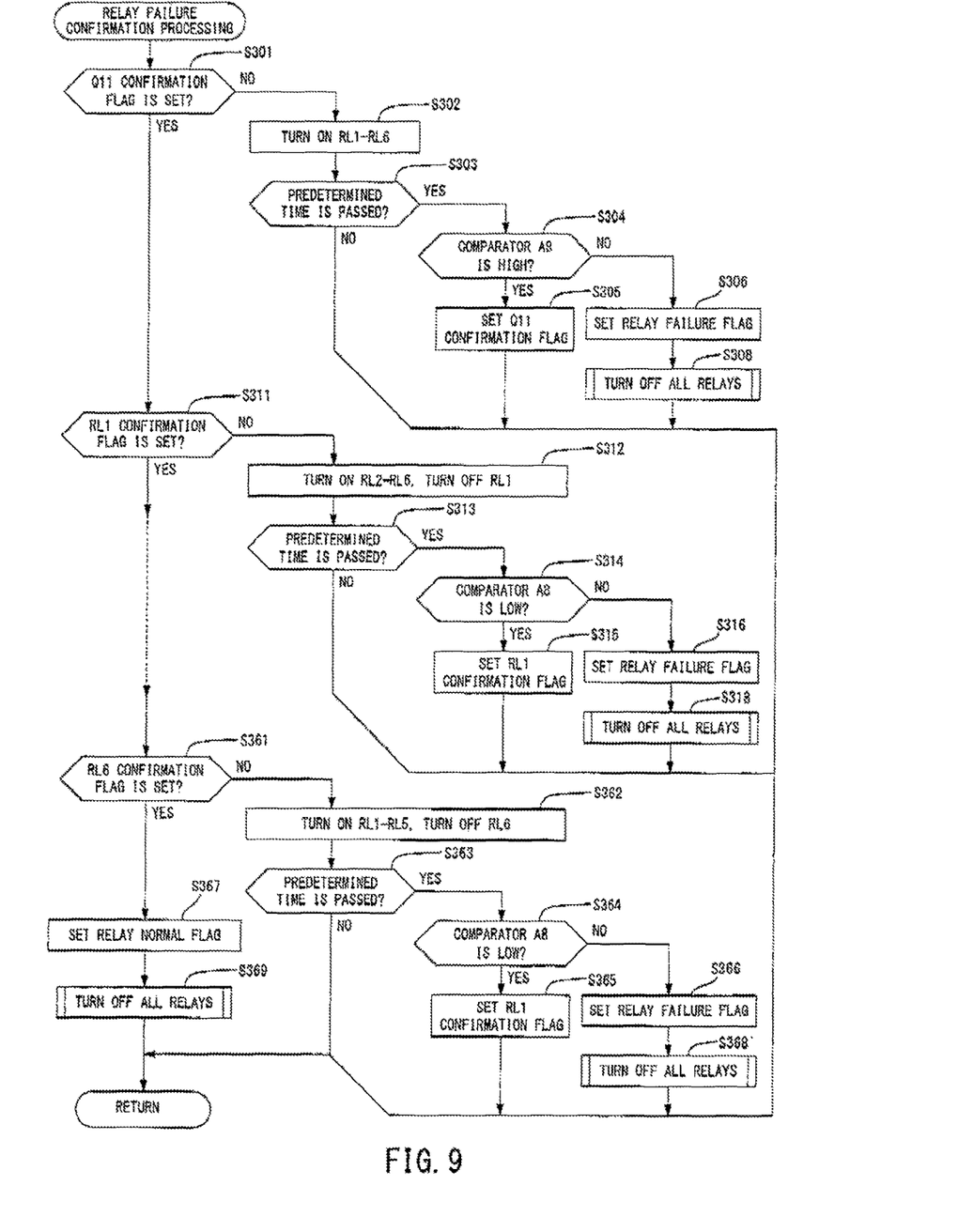
FIG. 9 is another control flowchart of the dust collector.

The relay control processing may be executed according to the flowcharts in FIGS. 8 and 9. When the drive switch SW 2 of the motor 14 is switched on (YES in S201 of FIG. 8), a relay failure flag may be confirmed in S202. When the drive switch SW2 is switched on for the first time after the main power switch SW1 is switched on, a relay failure judgment may not have been performed. Thus, a judgment in S202 may be YES, and then in S203 a judgment about whether the power source has been changed or not may be performed. If the power source has not been changed since the drive switch SW2 is switched on (NO in S203) then it may be confirmed in S204 whether there is an OFF state for each adjusting element (the first FET Q8, the second FET Q11, and the bidirectional thyristor Q13). If the adjusting elements are confirmed to be in an OFF state (YES in S204), and a relay normal flag is not set (NO in S205), then in S207, a relay failure confirmation processing may be performed.

In the relay failure confirmation processing, operations of the first relay switch RL1 to the sixth relay switch RL6 located in the DC circuit 40 may be checked according to the flowchart shown in FIG. 9. At first, as shown in FIG. 9, in S301, it may be checked at a predetermined time point whether an operation of the second FET Q11 has been confirmed. If an operation of the second FET Q11 has not been confirmed at the time point, (NO in S301), then each contact of the first relay RL1 to the sixth relay RL6 may be closed (switched on) in S302. After a predetermined time is passed (YES in S303), a voltage is applied to the relay switches RL1 to RL 6, the motor 14, and the negative line 43 from the voltage application part 46 (+12 V), and may be checked via a comparator A8 by comparison to a reference voltage. By confirming the voltage of the voltage application part 46 (+12 V) in the comparator A8 (H), it may be confirmed whether each contact of the first relay switch RL1 to the sixth relay switch RL6 is correctly closed and the second FET Q11 is correctly switched off. In this case, a judgment may be YES in S304, and then an operation confirmation flag of the second FET Q11 (Q11 confirmation flag) may be set. When the voltage of the voltage application part 46 is not confirmed in the comparator A8 (L), it may be judged that any contact(s) of the relay switches RL1 to RL6 may not be closed, and a relay failure flag may be set in S306. Then, because a failure has been confirmed, all contacts of the relays RL1 to RL6 may be opened (switched off), which means that the motor 14 cannot be energized.

When the relay failure confirmation processing is performed at the next predetermined time interval at S301, the judgment may now be YES in S301 if the Q11 confirmation flag has been set in S305 as performed at the previous time point, as explained above. In this case, in S311, it may be confirmed that an operation of the first relay RL 1 has been performed. At the current time point at which S311 is checked, if the operation of the first relay RL1 has not been performed (NO in S311), then, in S312, a contact of the first relay RL1 may be opened (switched off) while the second relay switch RL2 to the sixth relay switch RL6 are closed (switched on). Then, after a predetermined time is passed (YES in S313), a voltage is applied to the positive line 41, the motor 14, and the negative line 43 by the voltage application part 46, to test whether the relay switch contacts have correctly opened in the comparator A8, wherein the comparator reading should be low. When the voltage of the voltage application part 46 is confirmed to be low in the comparator A8 (L), it may be confirmed that a contact of the first relay RL1 is correctly opened. In this case, a judgment may be YES in S314, and then in S315, an operation confirmation flag of the first relay RL1 (RL1 confirmation flag) may be set. However, if the voltage of the voltage application part 46 is confirmed to not be low in the comparator A8 (H), it may be judged that a contact of the first relay switch RL1 has not been opened. Thus, in S316, a relay failure flag may be set. Furthermore, because a failure has been confirmed, all contacts of the relay RL1 to RL6 may be opened in S318, which means that the motor 14 cannot be energized. Similar processing may be performed with respect to the second relay switch RL2 to the sixth relay switch RL6 (refer to S361 to S368). In FIG. 9, failure judgments with regard to the second relay RL2 to the sixth relay RL6 are omitted. When all relays RL1 to RL 6 are confirmed to be correctly operated, a relay normal flag may be set in S367. Next, in S369, all contacts of the relays RL1 to RL12 may be temporarily opened (switched off) and the relay failure confirmation processing may be finished.

In FIG. 9, when a predetermined time has not passed in S303, S313, and S363 after relay operations are performed in S302, S312, and S362, the relay failure confirmation processing of step S207 may be finished, meaning the procedure may be returned to S207 in FIG. 8. This is because it may take time to close contacts of the relays after each coil of the relays is energized and it may be necessary to wait to stabilize closing and opening states of the contacts.

When the relay failure confirmation processing (the processing shown in FIG. 9) is finished, a procedure may return to S207 in FIG. 8, and furthermore return to S107 in FIG. 7. Next, a motor control processing may be executed in S108. The motor control processing may be executed according to a flowchart shown in FIG. 10. In S400 of FIG. 10, it may be confirmed whether the drive switch SW2 is switched on. As described earlier, if the drive switch SW2 has been switched on (YES in S400), then a changing of the power source (AC or DC) may be confirmed in S401. If the power source has not been changed (NO in S401), and then the relay normal flag may be checked in S402. If the relay normal flag has been set (YES in S402), then in S403 it may be checked whether the relay switches are closed (switched on). At a time point S403, if the relay switches RL1 to RL 12 are detected as opened and not having been switched on (NO in S403), the procedure may return to S108 in FIG. 7, and then a display processing in S109 and a sleep processing in S110 may be executed in turn.

Then, after the processing in S101 to S106 may be executed again, the relay control processing in S107 may be executed again. The procedure may proceed to S201 in FIG. 8. At this time point if the confirmations at the various stops are YES in S201, YES in S202, NO in S203 and YES in S204, then in S205, it may be confirmed whether the first relay switch RL1 to the sixth relay switch RL 6 are normal. If so, because all of the first relay RL1 to the sixth relay switches RL 6 are normal (YES in S205), a relay ON control processing may be executed (S206). Then, at that time point, both AC power and DC power are supplied. As described earlier, in the program stored in the memory a microcomputer controller A1, processes may be performed such that AC power is prioritized, and accordingly each contact of the first relay RL 7 to the sixth relay RL12 in the AC circuit 30 may be closed (switched on) by the relay ON control processing.

Figure 10:
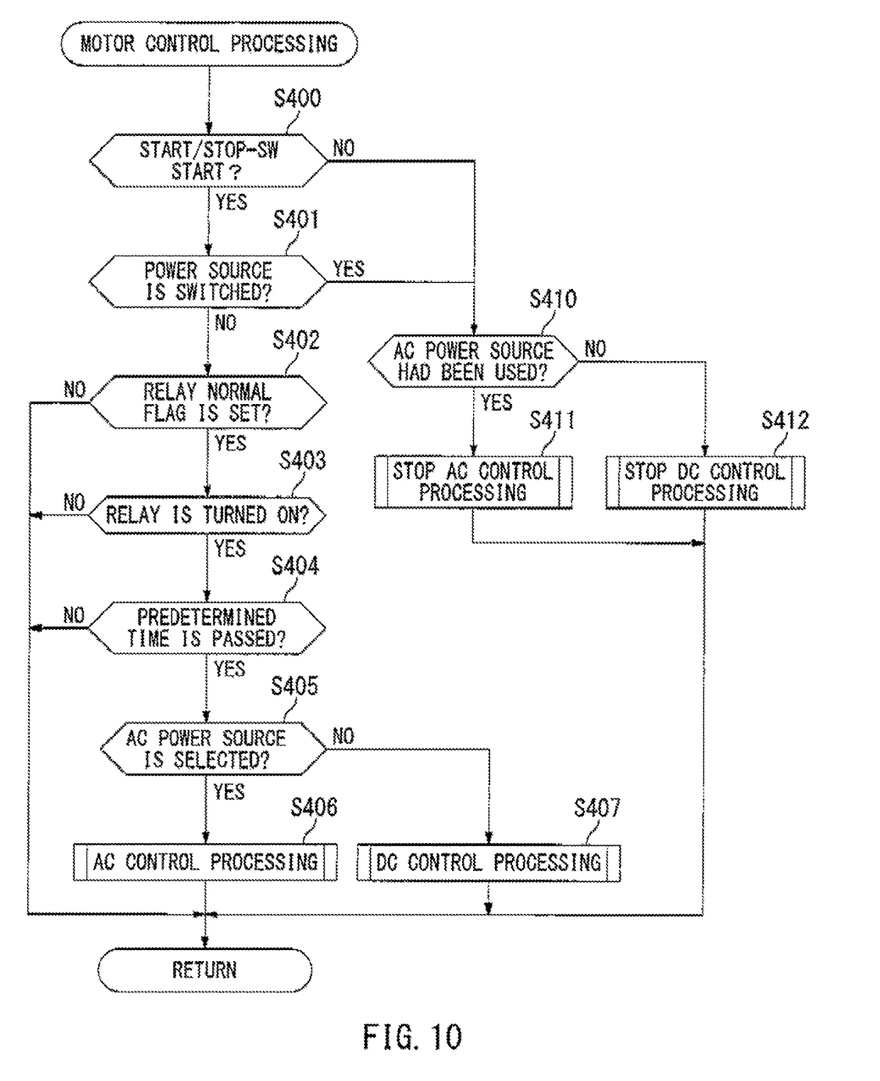
FIG. 10 is another control flowchart of the dust collector.

Next, the procedure may proceed to S108 in which the motor control processing shown in FIG. 10 may be executed. In FIG. 10, because each contact of the first relay RL 7 to the sixth relay RL 12 of the AC circuit may be closed, the confirmations of the steps may yield results of YES in S400, NO in S401, YES in S402, and YES in S403. If so, then in S404, it may be confirmed whether a predetermined time is passed since each contact of the first relay RL 7 to the sixth relay RL12 has been closed. When the predetermined time is passed (YES in S404), it may be confirmed whether the AC power source is selected. At this time point, if AC power source is selected, then AC control processing may be executed in S406. In more detail, in S406, the microcomputer controller A1 may control a rotating speed of the motor 14 by operating the bidirectional thyristor Q13 to adjust electric power supplied to the motor 14 based on the speed adjustment volume 22. Because of this construction, a suction force of the dust collector 10 can be adjusted. In this way, the contacts of the first relay RL 7 to the sixth relay RL 12 may be closed before the bidirectional thyristor Q13 being operated, and thus because of this sequence of operations current may not be flowed even when the contacts of the first relay RL 7 to the sixth relay RL 12 are closed. Accordingly, the contacts of the relays can be protected.

In the motor control processing, when the drive switch SW2 of the motor 14 is switched off, a judgment in S400 of FIG. 10 may be NO, and it may be confirmed in S410 whether the AC power source is selected. At that time point, if the AC power source is selected (YES in S410), then an AC control stop processing may be performed in S411. In this processing, the microcomputer controller A1 may switch off the bidirectional thyristor Q13 to stop the motor 14. Furthermore a judgment in S201 in the relay control processing shown in FIG. 8 may be NO, and then in S212, it may be confirmed whether the switching and/or adjusting elements (the first FET Q8, the second FET Q11, an FET in the stepup converter 41p, and the bidirectional thyristor Q13) are switched off. If the adjusting elements may be switched off (YES in S212), then in S213, all of the first relay RL7 to the sixth relay switches RL12 of the AC circuit 30 may be switched off. The first relay RL 1 to the sixth relay switches RL 6 of the DC circuit 40, as mentioned above, may be retained in a OFF state. Furthermore, the power source may not be switched from the DC power source to the AC power source (NO in step S214), the procedure may proceed to S108 shown in FIG. 7. As described earlier, all relays may be switched off, and thus the motor 14 may be retained in a stopped state. Furthermore, abnormalities during a driving or stopping of the motor 14 and a battery remaining capacity etc. may be displayed in S109 shown in FIG. 7. Furthermore, when a predetermined time has passed after the motor 14 is stopped, a sleep processing (S110 shown in FIG. 7) in which power consumption of the regulated power converters 34 and 44 or the microcomputer controller A1 is suppressed may be performed. When the AC power source is selected, the sleep processing may not be performed.

Next, when the drive switch SW2 of the motor 14 is switched on again, a judgment in S201 in the relay control processing shown in FIG. 8 may be YES. Then, if the confirmations of steps S202 and S203 result in YES in S202 and NO in S203, then in S204 it may be confirmed whether the switching and/or adjusting elements (the first FET Q8, the second FET Q11, the FET in the stepup converter 41p, and the bidirectional thyristor Q13) are switched off. If the adjusting elements are switched off (YES in S204), then the relay normal flag is set (YES in S205), and accordingly, relay ON control processing may be executed (S206). In S206, an operation to close the contacts of the first relay RL 1 to the sixth relay RL6 switches located in the AC circuit 30 may be performed. Then, the motor control processing may be executed in S108 shown in FIG. 7. In the motor control processing, if the various confirmations are YES in S400, NO in S401, YES in S402, YES in S403, and YES in S404, then in S406, an AC control processing may be executed. That is, a motor control processing may be executed by the AC circuit 30. In this way, when the motor 14 is driven in without changing the power source, the relay failure confirmation processing (S207 shown in FIG. 8; FIG. 10) may not be performed.

Next, an explanation will be made about a case where the batteries 26 are attached to the dust collector main body 12, the motor 14 of the dust collector main body 14 is driven by the AC circuit 30 (the drive switch SW 2 is switched on), and the plug 17 of the power cord 16 is pulled out of the wall outlet 11. In this case, the microcomputer A1 may not detect the detection signal from the regulated power converter 34 located in the AC circuit 30. Accordingly, the microcomputer A1 may judge that power supply from the AC power source has stopped. That is, in the motor control processing shown in FIG. 10, a judgment whether the power source is changed may be YES in S401. Then, in S410, it may be confirmed whether the AC power source had been used. Because the AC power source had been used until then, this would result in a confirmation of YES in S410, where then in S411, an AC control stop processing may be executed. In more detail, the microcomputer controller A1 may switch off the bidirectional thyristor Q13 to stop the motor 14. The drive switch SW2 of the motor 14 has been switched on, and accordingly a judgment in S201 shown in FIG. 8 may be YES. Furthermore, the relays have no failure (YES in S202), and the power source has been changed (YES in S203). Then, in S210, a relay normal flag and a relay failure flag may be cleared, and in S211, a second FET Q11 confirmation flag and a RL1 to RL6 confirmation flag may be cleared.

Next, in S212, it may be confirmed whether the switching and/or adjusting elements (the first FET Q8, the second FET Q11, the FET in the stepup converter 41p, and the bidirectional thyristor Q13) are switched off. The bidirectional thyristor Q13 may be switched off as described above, and accordingly a judgment in S212 may be YES. If so, then in S213, all relays (the first relay RL7 to the sixth relay switch RL 12, and the first relay RL1 to the sixth relay switch RL6) may all be switched off. Furthermore, the power source may be changed from the AC power source to the DC power source, and accordingly a judgment in S214 may be NO. Then, a procedure may proceed to the motor control processing in S108 shown in FIG. 7. As described earlier, all of the relays may be switched off, and accordingly the motor 14 may be retained in the stopped state.

Next, when the drive switch SW2 of the motor 14 is switched on in a state where the battery 26 is attached to the dust collector main body 12 and the plug 17 of the power cord 16 is pulled out of the wall outlet 11, a judgment in S201 shown in FIG. 8 may be YES. Furthermore, the relays may have no failure (YES in S202), and the power source has not been changed (NO in S203). If so, then, in S204, it may be confirmed whether the switching and/or adjusting elements (the first FET Q8, the second FET Q11, the FET of the stepup converter 41p, and the bidirectional thyristor Q13) are switched off. The adjusting elements may be switched off (YES in S204), and the relay normal flag may be cleared (NO in S205). In this case, then, in S207, the relay failure confirmation processing, which is shown in FIG. 9, may be executed. When it is confirmed that the relays are normal in the relay failure confirmation processing, then a judgment in S205 shown in FIG. 8 may be YES, and the relay ON control processing may be executed in S206. In the relay ON control processing, the contacts of the first relay RL1 to the sixth relay switch RL6 located in the DC circuit may be closed.

Figure 7:
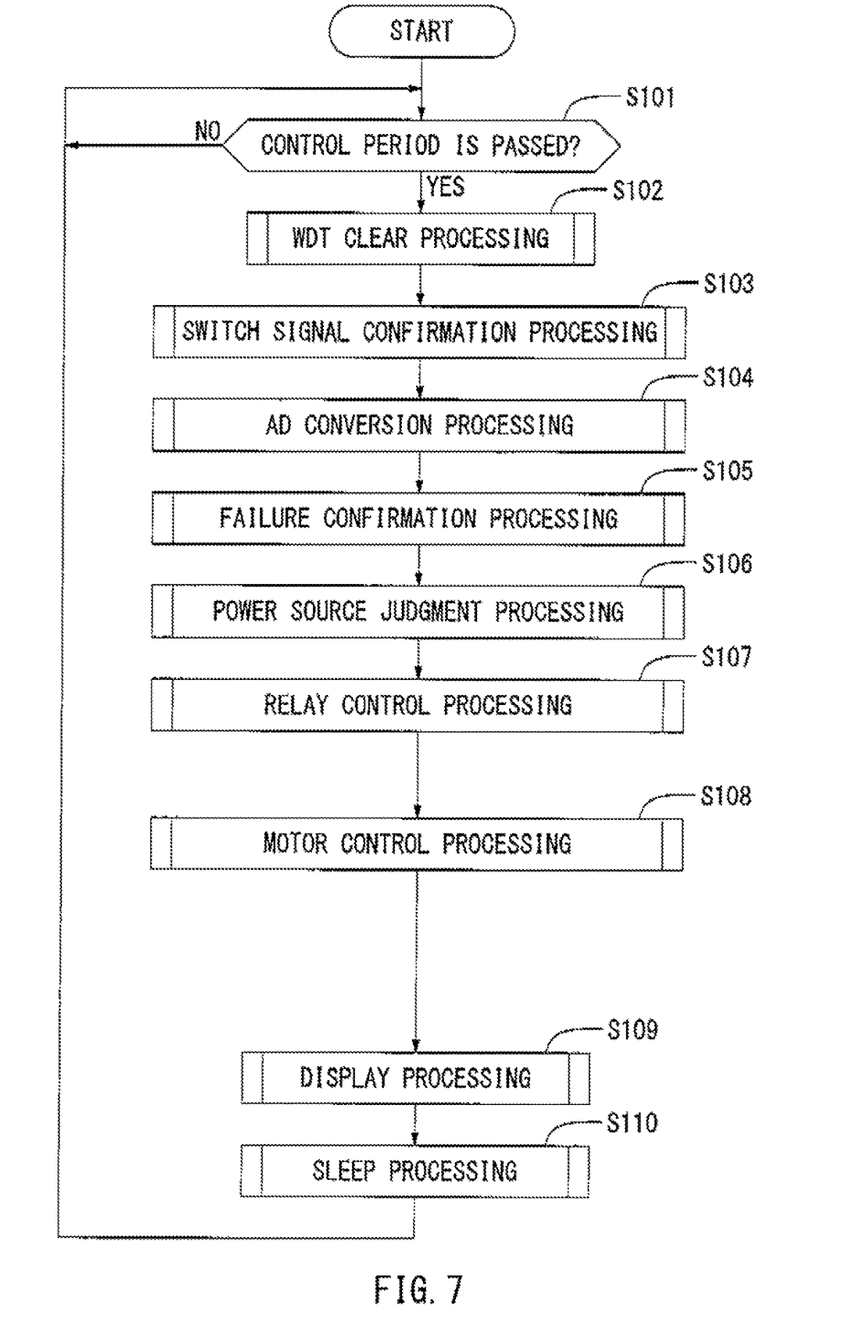
FIG. 7 is a control flowchart of the dust collector.

Next, the motor control processing (S108 shown in FIG. 7; FIG. 10) may be executed. In the motor control processing shown in FIG. 10, if the confirmations for the various steps are YES in S400, NO in S401, YES in S401-S404, and No in S405 because the DC power source at the current time point, then, in S407, a DC control processing may be executed. In the DC control processing, the motor control may be performed by the DC circuit 40. In more detail, the microcomputer controller A1 may switch on the first FET Q8, and then activate the stem converter 41p by outputting a control signal to the stepup converter 41p. Furthermore, the microcomputer controller A1 may control a rotating speed of the motor 14 by switching on and off the second FET Q11 to adjust electric power supplied to the motor 14 based on the speed adjustment volume 22. To summarize, when the plug 17 of the power cord 16 is pulled out of the wall outlet 11 while the motor 14 is driven by the AC circuit 30 with the battery 26 attached to the dust collector main body 12, the motor 14 may not be driven unless the drive switch SW2 of the motor 14 is switched on again, in which case the motor control processing is performed.

Next, an explanation will be made about a case where the plug 17 of the power cord 16 is inserted in the wall outlet 11 while the motor control is performed by the DC circuit 40 (the drive switch SW2 is switched on). As described earlier, per the program stored in the memory of microcomputer controller A1, processes may be performed such that AC power is prioritized. In this case, in S401 in the motor control processing shown in FIG. 10, it may be confirmed whether the power source is changed, and the judgment may be YES, due to the power cord being inserted into the wall outlet. Then, in S410, it may be confirmed whether the AC power source had been used. The DC power source had been used until the current time point, which would thus result as NO in S410, whereby then in S412, a DC control stop processing may be performed. In more detail, the microcomputer controller A1 may switch off the second FET Q11 to stop the motor 14. Next, the microcomputer controller A1 may output a stop signal to the stepup converter 41p to stop before switching off the first FET Q8. The drive switch SW2 of the motor 14 has been switched on as described above (an ON signal from the drive switch SW2 has been retained), and accordingly, a judgment in S201 shown in FIG. 8 may be YES. If the relays have no failure (YES in S202), and the power source is changed (YES in S203), then in S210 the relay normal flag and the relay failure flag may be cleared. Then, in S211 the second FET Q11 confirmation flag and the RL1-RL6 confirmation flag may be cleared.

Next, in S212, it may be confirmed whether the switching and/or adjusting elements (the first FET Q8, the second FET Q11, the FET of the stepup converter 41p, and the bidirectional thyristor Q13) are switched off. If the first FET Q8 and the second FET Q11 are be switched off, then accordingly, a judgment in S212 may be YES. Then, in S213, all relays (the first relay RL7 to the sixth relay switch RL12, and the first relay RL1 to the sixth relay switch RL 6) may be switched off. Furthermore, the power source may be changed from the DC power source to the AC power source, and accordingly a judgment in S214 may be YES. As previously described, the second FET Q11 confirmation flag and the RL1-RL6 confirmation flag may be cleared, and thus a judgment in S205 may be NO, and then in S207 (and FIG. 9) the relay ON control processing may be executed. When it is confirmed that the relays are normal in the relay ON control processing (YES in S205 shown in FIG. 8), the relay ON control processing (S206) may be executed. In the relay ON control processing, the contacts of the first relay RL7 to the sixth relay switch RL 12 located in the AC circuit may be closed.

Next, the motor control processing may be executed based on S108 shown in FIGS. 7 and 10. In the motor control processing shown in FIG. 10, if the results of the various confirmations are YES in S400, NO in S401, YES in S402 to S404, and YES in S405 because the AC power source is being used at the current time point, then, in S406, the AC control processing may be executed. That is, the microcomputer controller A1 may control rotating speed of the motor 14 by operating the bidirectional thyristor Q13 to adjust electric power supplied to the motor 14 based on the speed adjustment volume 22. To summarize, when the plug 17 of the power cord 16 is inserted in the wall outlet 11 while the motor 14 is driven by the DC circuit 40, the motor control processing may be executed by the AC circuit after checking the first relay RL 1 to the sixth relay switch RL6.

According to the present teaching of the dust collector 10, the motor 14 may be configured to drive by both the AC power source and the DC power source. Furthermore, the AC circuit 30 in which AC power is supplied to the motor 14 and the DC circuit 40 in which DC power is supplied to the motor 14 may be configured to be changed in an insulated state relative to each other through the operations of the microcomputer controller A1, the first relay switch RL1 to the sixth relay switch RL6 of the DC circuit, and the first relay switch RL7 to the sixth relay switch RL12 of the AC circuit. Because of this construction, an AC/DC converter etc., which often includes an isolation transformer, as described above, for converting AC power to DC power to supply power to the motor is not needed, and thus the dust collector 10 can be made in a substantially more compact structure. Furthermore, because the first relay switch RL1 to the sixth relay switch RL6, and the first relay switch RL7 to the sixth relay switch RL12 are used, the AC circuit 30 and the DC circuit 40 can be easily and reliably changed relative to each other to supply power to the motor in an insulated state.

Furthermore, in the AC circuit 30, the first relay switch RL 7 to the sixth relay switch RL12 may be arranged such that the relays RL7-RL9 are located in the positive line 31 and the relays RL10-RL12 are located in the negative line 32 (where the positive line and the negative line in the AC circuit are as defined above). Furthermore, in the DC circuit 40, the first relay switch RL1 to the sixth relay switch RL6 may be arranged such that the relays RL1-RL3 are located in the positive line 41 and the relays RL4-RL6 are located in the negative line 43. Because of this construction, an insulated state between the AC circuit 30 and the DC circuit 40 can be easily and reliably obtained. According to the dust collector 10 of the present teaching, the dust collector and its controlled components, along with microcomputer A1 as described above, may be configured such that the operations of the first relay switch RL1 to the sixth relay switch RL6 in the DC circuit 40 are checked before the motor 14 is driven for the first time after the main power switch SW1 is switched on. Furthermore, the dust collector also may be configured such that the operations of the first relay switch RL1 to the sixth relay switch RL6 in the DC circuit 40 are checked when switching between the AC circuit 30 and the DC circuit 40 is performed. Because of this configuration, reliability of the switching between AC power and DC power can be improved.

Furthermore, in a case where the plug 17 of the power cord 16 is pulled out of the wall outlet 11 (i.e., the AC power source is disconnected) with the battery 26 connected, the microcomputer A1 may switch off the bidirectional thyristor Q13 to stop driving of the motor 14. Because of this construction, for example, the motor 14 may not be driven by the battery 26 with the plug 17 pulled out of the wall outlet 11. Thus, a trouble may not occur such that the battery 26 has decreased without realizing it. Furthermore, the AC circuit 30 may have the adjusting element, i.e., the bidirectional thyristor Q13, and the DC circuit 40 may include the adjusting element, i.e., the second FET Q11, which are used for adjusting electric power supplied to the motor 14. The microcomputer A1 may open and/or close the contacts of the RL1-RL6 and the RL7-RL12 while the adjusting elements Q11 and Q13 are switched off. Accordingly, current may not flow when the contacts of the RL1-RL12 are opened and/or closed. Thus, the contacts of the relays RL1-RL12 may be reliably protected.

Furthermore, the first protection circuit 51 to the sixth protection circuit 56 (interlock circuits) may be provided such that the contacts of the RL1-RL6 in the DC circuit 40 may not be closed while the contacts of the RL7-RL12 in the AC circuit 30 are closed, as shown in FIG. 6. Because of this construction, even if the microcomputer A1 malfunctions, a failure such that current flows simultaneously both in the AC circuit 30 and the DC circuit 40 may not occur. Furthermore, the first relay switch RL7 and the sixth relay switch RL12 in the AC circuit, the first relay switch RL1 and the sixth relay switch RL6 in the DC circuit 40, and the first protection circuit Si and the sixth protection circuit 56 (interlock circuits), respectively, may be mounted on the second electrical circuit board K2. Furthermore, the second relay switch RL8 to the fifth relay switch RL11 in the AC circuit 30, the second relay switch RL2 to the fifth relay switch RL5 in the DC circuit 40, and the second protection circuit 52 to the fifth protection circuit 55 (interlock circuits), respectively, may be mounted on the third electrical circuit board K3. Because of this construction, wirings of the first protection circuit 51 to the sixth protection circuit 56 (interlock circuits) may not be crossed between the electrical circuit boards. Accordingly, disconnection of the wirings of the interlock circuits comprising the first protection circuit 51 to the sixth protection circuit 56 etc. can be prevented. Thus, reliability of the first protection circuit 51 and the sixth protection circuit 56 can be improved.

The present invention is not limited to the embodiments discussed above and may be further modified without departing from the scope and spirit of the present teachings. For example, in the embodiments discussed above, three relay switches (RL7-RL9) may be provided in the positive line 31 and three relay switches (RL10-RL12) in the negative line 32 of the AC circuit 30. Furthermore, three relay switches (RL1-RL3) may be provided in the positive line 41 and three relay switches (RL4-RL6) in the negative line 43 of the DC circuit 40. However, by use of a large-sized relay switch in which intervals of the relay terminal are large when the contacts are opened, the number of relay switches provided in the positive lines 31 and 41 and the negative lines 32 and 43 may be decreased. Furthermore, in the embodiments discussed above, the second protection circuit 52 to the fifth protection circuit 55 may be mounted on the third electrical circuit board K3. However, these protection circuits 52-55 may be mounted on the second electrical circuit board K2. Furthermore, in the embodiments discussed above, the dust collector 10 may be exemplified as an electronic power equipment. However, other than the dust collector 10, the present teaching may be applied to other electronic power equipment, such as an electronic lawn mower, an electronic high pressure washer, an electronic circular saw, an electronic reciprocating saw, an electronic cutter, an electronic chain saw, or an electronic planar, etc.

What is claimed is:

1. An electronic power equipment device, wherein the device is electronically powered and is configured to be connected to an AC power source and/or a DC power source, wherein the device comprises:
    a universal motor configured to be driven by both AC power and DC power;
    an AC circuit for supplying the AC power to drive the motor;
    a DC circuit for supplying the DC power to drive the motor;
    a plurality of relay switches for switching between the AC circuit and the DC circuit in an insulated manner, where through the actions of the relay switches both circuits are insulated relative to each other; and
    a controller configured to control the AC circuit, the DC circuit, and the plurality of relay switches, wherein
    each relay switch of the plurality of relay switches comprises a mechanical contact, and
    the plurality of relay switches are arranged in both a positive line and a negative line in the AC circuit and both a positive line and a negative line in the DC circuit, wherein at least one relay switch is present per line, where the positive lines and the negative lines of both the AC and DC circuits are connected to the universal motor.

2. The electronic power equipment device according to claim 1, wherein
    the plurality of relay switches comprises:
    a plurality of relay switches arranged in series in both the positive line and the negative line in the AC circuit; and
    a plurality of relay switches arranged in series in both the positive line and the negative line in the DC circuit.

3. The electronic power equipment device according to claim 1, wherein,
    the controller is configured to perform a running test of the relay switches in the positive line and the negative line in the DC circuit before driving the motor for the first time after the electronic power equipment device is powered on.

4. The electronic power equipment device according to claim 1, wherein,
    the controller is configured to perform a running test of the relay switches in the positive line and the negative line in the DC circuit before switching between the AC circuit and the DC circuit.

5. The electronic power equipment device according to claim 1, wherein,
    the controller is configured to supply power to the motor from the AC power source when the electronic power equipment device is connected to both the AC power source and the DC power source.

6. The electronic power equipment device according to claim 5, wherein,
    the controller is configured to stop running the motor when the AC power source is disconnected from the electronic power equipment device.

7. The electronic power equipment device according to claim 1, wherein,
    both the AC circuit and the DC circuit each include at least one adjusting element for adjusting electric power supplied to the motor; and the controller is configured to switch the mechanical contacts of the plurality of relay switches from their pre-existing state to the opposite state while switching off the adjusting element.

8. The electronic power equipment device according to claim 1, further comprising,
   at least two interlock circuits configured to prevent the mechanical contacts of the relay switches in the DC circuit from closing when the mechanical contacts of the relay switches in the AC circuit are closed.

9. The electronic power equipment device according to claim 8, wherein the device comprises one electronic circuit board where:
   i) at least one relay switch in each of the positive and negative lines, respectively, in the AC circuit,
   ii) at least one relay switch in each of the positive and negative lines, respectively, in the DC circuit, and
   iii) at least two interlock circuits corresponding to the relay switches are located on the same electronic circuit board, wherein each interlock circuit corresponds to one of the relay switches in the AC circuit and the DC circuit, wherein the interlock circuit is configured to prevent the mechanical contact of the relay switch in the DC circuit from closing when the mechanical contact of the relay switch in the AC circuit is closed.

10. The electronic power equipment device according to claim 1, further comprising,
    a main switch configured to switch on and off, collectively, the positive and negative lines in the AC circuit and a DC line connected to the DC power source.

11. An electronic power equipment device, wherein the device is electronically powered and is configured to be connected to an AC power source and/or a DC power source, wherein the device comprises:
    a universal motor configured to be driven by both AC power and DC power;
    an AC circuit for supplying the AC power to drive the motor;
    a DC circuit for supplying the DC power to drive the motor;
    a plurality of relay switches for switching between the AC circuit and the DC circuit in an insulated manner, each comprising a mechanical contact, where through the actions of the relay switches both circuits are insulated relative to each other, wherein the plurality of relay switches are arranged in both a positive line and a negative line in the AC circuit and both a positive line and a negative line in the DC circuit, wherein the plurality of relay switches are arranged such that there are at least three relay switches arranged in series in each of both the positive and negative lines in each of both the AC and DC circuit;
    a controller configured to control the AC circuit, the DC circuit, and the plurality of relay switches;
    at least six interlock circuits wherein each interlock circuit corresponds to one of the relay switches in the AC circuit and the DC circuit, wherein each interlock circuit is configured to prevent the mechanical contact of the corresponding relay switch in the DC circuit from closing when the mechanical contact of the corresponding relay switch in the AC circuit is closed.

12. The electronic power equipment device according to claim 11, wherein the device further comprises a plurality of electronic circuit boards where:
    i) at least one relay switch in each of the positive and negative lines, respectively, in the AC circuit,
    ii) at least one relay switch in each of the positive and negative lines, respectively, in the DC circuit, and
    iii) at least two interlock circuits corresponding to the relay switches are located on each circuit board, wherein at least one of the circuit boards also comprises an adjusting element consisting of a bidirectional thyristor.

13. The electronic power equipment device according to claim 11, wherein the controller is a microcomputer, and is configured by a program stored in a non-transient memory of the microcomputer to manipulate the mechanical contacts of the relay switches of the device in order to effect switching between the AC circuit and the DC circuit in an insulated manner in order to supply power to the device.

* * * * *